US012573073B2

(12) United States Patent
Hewitt et al.

(10) Patent No.: US 12,573,073 B2
(45) Date of Patent: Mar. 10, 2026

(54) JOINT ROTATION/LOCATION FROM EGOCENTRIC IMAGES

(71) Applicant: Microsoft Technology Licensing, LLC, Redmond, WA (US)

(72) Inventors: Charles Thomas Hewitt, Cambridge (GB); Hanz Cuevas Velasquez, Edinburgh (GB); Mohammad Sadegh Ali Akbarian, Cambridge (GB); Tadas Baltrusaitis, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 387 days.

(21) Appl. No.: 18/163,105

(22) Filed: Feb. 1, 2023

(65) Prior Publication Data

US 2024/0257382 A1 Aug. 1, 2024

(51) Int. Cl.
*G06K 9/00* (2022.01)
*G06T 7/70* (2017.01)

(52) U.S. Cl.
CPC ...... *G06T 7/70* (2017.01); *G06T 2207/20081* (2013.01); *G06T 2207/20084* (2013.01); *G06T 2207/30196* (2013.01)

(58) Field of Classification Search
CPC .......... G06V 10/82; G06T 2207/20084; G06T 2207/30196; G06T 7/70
See application file for complete search history.

(56) References Cited

U.S. PATENT DOCUMENTS

| | | | | |
|---|---|---|---|---|
| 2020/0364576 | A1* | 11/2020 | Kim | G06V 10/82 |
| 2021/0193313 | A1* | 6/2021 | Mahfouz | A61B 5/1036 |
| 2022/0319041 | A1* | 10/2022 | Jiang | G02B 27/017 |
| 2022/0327389 | A1* | 10/2022 | AlRegib | G06N 3/045 |

OTHER PUBLICATIONS

Mueller, Franziska, et al. "Real-time hand tracking under occlusion from an egocentric rgb-d sensor." Proceedings of the IEEE international conference on computer vision. 2017. (Year: 2017).*
Real-time hand tracking under occlusion from an egocentric rgb-d sensor (Year: 2017).*
Mohlin, David, Josephine Sullivan, and Gerald Bianchi. "Probabilistic orientation estimation with matrix fisher distributions." Advances in Neural Information Processing Systems 33 (2020): 4884-4893. (Year: 2020).*
Zhou, et al., "On the Continuity of Rotation Representations in Neural Networks", In Proceedings of the IEEE/CVF Conference on Computer Vision and Pattern Recognition, Jun. 16, 2019, pp. 5745-5753.
Varol, et al., "BodyNet: Volumetric Inference of 3D Human Body Shapes", In Proceedings of the European Conference on Computer Vision, Sep. 8, 2018, 17 Pages.
(Continued)

*Primary Examiner* — Hadi Akhavannik
(74) *Attorney, Agent, or Firm* — Barta Jones, PLLC

(57) ABSTRACT

To predict the pose of a person using images from egocentric cameras, at least one image from at least one egocentric camera is received, wherein the image depicts only a portion of the person. The method described herein uses a trained neural network to directly predict a distribution over rotation of a joint of the person or three-dimensional, 3D, location of a joint of the person.

20 Claims, 9 Drawing Sheets

ACCESS EGOCENTRIC TRAINING IMAGES WHERE JOINT ROTATIONS ARE KNOWN
404

REPRESENT THE ROTATION MATRIX OF EACH KNOWN JOINT AS A RANDOM VAIRABLE OF THE THREE-DIMENSIONAL SPECIAL ORTHOGONAL GROUP, DISTRIBUTED ACCORDING TO A MATRIX FISHER DISTRIBUTION DEFINED BY A PLURALITY OF FISHER PARAMETERS
406

TRAIN A NEURAL NETWORK TO OUTPUT PREDICTED VALUES FOR THE PLURALITY OF FISHER PARAMETERS USING THE INPUT TRAINING IMAGES BY MINIMISING THE MATRIX FISHER NEGATIVE LOG-LIKELIHOOD LOSS
408

(56) References Cited

OTHER PUBLICATIONS

Winkler, et al., "QuestSim: Human Motion Tracking from Sparse Sensors with Simulated Avatars", In repository of arXiv:2209. 09391v1, Sep. 20, 2022, 9 Pages.

Wood, et al., "3D Face Reconstruction with Dense Landmarks", In repository of arXiv:2204.02776v2, Jul. 20, 2022, 24 Pages.

Wood, et al., "Fake it till you make it: face analysis in the wild using synthetic data alone", In repository of arXiv:2109.15102v2, Oct. 5, 2021, 5 Pages.

Xu, et al., "Mo2Cap2: Real-time Mobile 3D Motion Capture with a Cap-mounted Fisheye Camera", In Journal of IEEE transactions on visualization and computer graphics, vol. 25, Issue 5, Feb. 15, 2019, pp. 2093-2101.

Zhang, et al., "EgoBody: Human Body Shape, Motion and Social Interactions from Head-Mounted Devices", In repository of arXiv:2112. 07642v1, Dec. 14, 2021, 17 Pages.

"Cycles Renderer", Retrieved From: https://www.cycles-renderer. org/, Retrieved From: Nov. 2, 2022, 1 Page.

"Marmoset Toolbag", Retrieved From: https://marmoset.co/ Toolbag/, Retrieved From: Nov. 2, 2022, 12 Pages.

"Marvelous Designer", Retrieved From: https://marvelousdesigner. com/, Retrieved From: Nov. 2, 2022, 4 Pages.

"Stereolabs", Retrieved From: https://www.stereolabs.com/, Retrieved From: Nov. 2, 2022, 6 Pages.

"Substance Painter", Retrieved From: https://www.adobe.com/ products/substance3d-painter.html, Retrieved From: Nov. 2, 2022, 12 Pages.

"Ten24 Animation Ready Body Scans", Retrieved From: https:// www.3dscanstore.com/retopologised-body-models/animation-ready-body-scans, Retrieved From: Nov. 2, 2022, 4 Pages.

Akada, et al., "UnrealEgo: A New Dataset for Robust Egocentric 3D Human Motion Capture", Retrieved From: arXiv:2208.01633v1, Aug. 2, 2022, 21 Pages.

Aliakbarian, et al., "FLAG: Flow-based 3D Avatar Generation from Sparse Observations", In Proceedings of the IEEE/CVF Conference on Computer Vision and Pattern Recognition, Jun. 18, 2022, pp. 13253-13262.

Bae, et al., "DigiFace-1M: 1 Million Digital Face Images for Face Recognition", In Proceedings of the IEEE/CVF Winter Conference on Applications of Computer Vision, Jan. 2023, pp. 3526-3535.

Bogo, et al., "Keep It SMPL: Automatic Estimation of 3D Human Pose and Shape from a Single Image", In Proceedings of European Conference on Computer Vision, Oct. 11, 2016, pp. 561-578.

Chen, et al., "Monocular Human Pose Estimation: A Survey of Deep Learning-based Methods", In repository of arXiv:2006.01423v1, Jun. 2, 2020, 23 Pages.

Choutas, et al., "Learning to Fit Morphable Models", In repository of arXiv:2111.14824v1, Nov. 29, 2021, 14 Pages.

Choutas, et al., "Monocular Expressive Body Regression through Body-Driven Attention", In Proceedings of European Conference on Computer Vision, Aug. 23, 2020, 21 Pages.

Elbamby, et al., "Toward Low-Latency and Ultra-Reliable Virtual Reality", In Journal of IEEE Network, vol. 32, Issue 2, Apr. 2, 2018, pp. 78-84.

Ferstl, et al., "Human Or Robot? Investigating Voice, Appearance and Gesture Motion Realism of Conversational Social Agents", In Proceedings of the 21st ACM International Conference on Intelligent Virtual Agents, Sep. 14, 2021, 8 Pages.

Guo, et al., "On Calibration of Modern Neural Networks", In Proceedings of the 34th International Conference on Machine Learning, Aug. 6, 2017, 10 Pages.

He, et al., "Deep Residual Learning for Image Recognition", In Proceedings of IEEE Conference on Computer Vision and Pattern Recognition (CVPR), Jun. 27, 2016, pp. 770-778.

Jiang, et al., "AvatarPoser: Articulated Full-Body Pose Tracking from Sparse Motion Sensing", In Proceedings of 17th European Conference Computer Vision—ECCV, Oct. 23, 2022, 19 Pages.

Kendall, et al., "What Uncertainties Do We Need in Bayesian Deep Learning for Computer Vision?", In Proceedings of the 29th Annual Conference on Neural Information Processing Systems, Dec. 4, 2017, 11 Pages.

Kingma, et al., "Adam: A Method for Stochastic Optimization", In repository of arXiv:1412.6980v1, Dec. 4, 2014, 9 Pages.

Koch, et al., "Siamese Neural Networks for One-shot Image Recognition", In Proceedings of the 32nd International Conference on Machine Learning, vol. 2, Jul. 6, 2015, 8 Pages.

Kolotouros, et al., "Learning to Reconstruct 3D Human Pose and Shape via Model-Fitting in the Loop", In Proceedings of IEEE/CVF International Conference on Computer Vision, Oct. 27, 2019, pp. 2252-2261.

Larochelle, et al., "A Distance Metric for Finite Sets of Rigid-Body Displacements via the Polar Decomposition", In Journal of Journal of Mechanical Design, vol. 129, Issue 8, Jul. 13, 2006, pp. 883-886.

Lee, Taeyoung, "Bayesian Attitude Estimation with the Matrix Fisher Distribution on SO(3)", In Journal of Transactions on Automatic Control, vol. 63, Issue 10, Oct. 2018, pp. 3377-3392.

Li, et al., "3D Human Pose Estimation from Monocular Images with Deep Convolutional Neural Network", In Proceedings of 12th Asian Conference on Computer Vision, Springer, Nov. 1, 2014, pp. 332-347.

Li, et al., "Generating Multiple Hypotheses for 3D Human Pose Estimation with Mixture Density Network", In Proceedings of IEEE Conference on Computer Vision and Pattern Recognition, Jun. 16, 2019, pp. 9887-9895.

Li, et al., "Maximum-Margin Structured Learning with Deep Networks for 3D Human Pose Estimation", In Proceedings of the IEEE international conference on computer vision, Dec. 7, 2015, pp. 2848-2856.

Loper, et al., "MoSh: Motion and Shape Capture from Sparse Markers", In Journal of ACM Transactions on Graphics, vol. 33, Issue 6, Nov. 19, 2014, 13 Pages.

Loper, et al., "SMPL: A Skinned Multi-Person Linear Model", In Journal of ACM Transactions on Graphics, vol. 34, Issue 6, Nov. 2, 2015, 16 Pages.

Ma, et al., "Learning to Dress 3D People in Generative Clothing", In Proceedings of the IEEE/CVF Conference on Computer Vision and Pattern Recognition, Jun. 13, 2020, pp. 6469-6478.

Mahmood, et al., "AMASS: Archive of Motion Capture as Surface Shapes", In Proceedings of the IEEE/CVF International Conference on Computer Vision, Oct. 27, 2019, pp. 5442-5451.

Martinez, et al., "A Simple yet Effective Baseline for 3D Human Pose Estimation", In Proceedings of the IEEE International Conference on Computer Vision, Oct. 22, 2017, pp. 2640-2649.

Mcduff, et al., "Synthetic Data for Multi-Parameter Camera-Based Physiological Sensing", In Proceedings of 43rd Annual International Conference of the IEEE Engineering in Medicine \& Biology Society, Oct. 31, 2021, pp. 3742-3748.

Mohlin, et al., "Probabilistic Orientation Estimation with Matrix Fisher Distributions", In Journal of Advances in Neural Information Processing Systems, vol. 33, Dec. 6, 2020, 10 Pages.

Oh, et al., "A Systematic Review of Social Presence: Definition, Antecedents, and Implications", In Journal of Frontiers in Robotics and AI, vol. 5, Oct. 15, 2018, 35 Pages.

Omran, et al., "Neural Body Fitting: Unifying Deep Learning and Model Based Human Pose and Shape Estimation", In Proceedings of International Conference on 3D Vision, Sep. 5, 2018, pp. 484-494.

Paszke, et al., "PyTorch: An Imperative Style, High-Performance Deep Learning Library", In Journal of Advances in Neural Information Processing Systems, vol. 32, Dec. 8, 2019, 12 Pages.

Pavlakos, et al., "Expressive Body Capture: 3D Hands, Face, and Body from a Single Image", In Proceedings of the IEEE/CVF Conference on Computer Vision and Pattern Recognition, Jun. 16, 2019, pp. 10975-10985.

Pavlakos, et al., "Learning to Estimate 3D Human Pose and Shape From a Single Color Image", In Proceedings of the IEEE Conference on Computer Vision and Pattern Recognition, Jun. 18, 2018, pp. 459-468.

Ponton, et al., "Combining Motion Matching and Orientation Prediction to Animate Avatars for Consumer-Grade VR Devices", In Journal of Computer Graphics Forum, vol. 41, Issue 8, Sep. 23, 2022, 12 Pages.

(56) References Cited

OTHER PUBLICATIONS

Qammaz, et al., "MocapNET: Ensemble of SNN Encoders for 3D Human Pose Estimation in RGB Images", In Proceedings of BMVC, Sep. 2019, 17 Pages.

Romero, et al., "Embodied Hands: Modeling and Capturing Hands and Bodies Together", In Journal of ACM Transactions on Graphics, vol. 36, Issue 6, Nov. 20, 2017, 17 Pages.

Sandler, et al., "MobileNetV2: Inverted Residuals and Linear Bottlenecks", In Proceedings of the IEEE conference on computer vision and pattern recognition, Jun. 18, 2018, pp. 4510-4520.

Sengupta, et al., "Hierarchical Kinematic Probability Distributions for 3D Human Shape and Pose Estimation From Images in the Wild", In Proceedings of the IEEE/CVF International Conference on Computer Vision, Oct. 10, 2021, pp. 11219-11229.

Sengupta, et al., "Synthetic Training for Accurate 3D Human Pose and Shape Estimation in the Wild", In repository of arXiv:2009. 10013v2, Sep. 22, 2020, 14 Pages.

Sun, et al., "Compositional Human Pose Regression", In Proceedings of the IEEE International Conference on Computer Vision, Oct. 22, 2017, pp. 2602-2611.

Sun, et al., "SHIFT: A Synthetic Driving Dataset for Continuous Multi-Task Domain Adaptation", In Proceedings of the EEE/CVF Conference on Computer Vision and Pattern Recognition, Jun. 18, 2022, pp. 21371-21382.

Tekin, et al., "Structured Prediction of 3D Human Pose with Deep Neural Networks", In repository of arXiv:1605.05180v1, May 17, 2016, 11 Pages.

Thomas, et al., "Open Synthetic Dataset for Improving Cyclist Detection", Retrieved From: https://paralleldomain.com/open-datasets/bicycle-detection, Nov. 2021, 8 Pages.

Tome, et al., "XR-EgoPose: Egocentric 3D Human Pose From an HMD Camera", In Proceedings of the IEEE/CVF International Conference on Computer Vision, Oct. 27, 2019, pp. 7728-7738.

Cuevas-Velasquez, et al., "SimpleEgo: Predicting Probabilistic Body Pose from Egocentric Cameras." arXiv preprint arXiv:2401.14785, Jan. 26, 2024, 22pages.

International Search Report and Written Opinion received for PCT Application No. PCT/US2024/13620, May 6, 2024, 17 pages.

Liu, et al., "Egofish3d: Egocentric 3d pose estimation from a fisheye camera via self-supervised learning." IEEE Transactions on Multimedia, Mar. 3, 2022, 11 pages.

Sengupta, et al., "Hierarchical kinematic probability distributions for 3D human shape and pose estimation from images in the wild." In Proceedings of the IEEE/CVF international conference on computer vision, Oct. 2021, pp. 11199-11209.

Tome, et al., "SelfPose: 3D Egocentric Pose Estimation from a Headset Mounted Camera", ArXiv:2011.01519, Cornell University Library, Nov. 2, 2020, pp. 1-13.

Wang, et al., "Scene-Aware Egocentric 3D Human Pose Estimation", 2023 IEEE/CVF Conference on Computer Vision and Pattern Recognition (CVPR), Dec. 20, 2022, pp. 1-10.

International Preliminary Report On Patentability received for PCT Application No. PCT/US2024/013620, mailed on Aug. 14, 2025, 11 pages.

* cited by examiner

PER-JOINT ROTATION UNCERTAINTY 208

PER-VERTEX UNCERTAINTY 210

RECEIVE IMAGE(S) DEPICTING ONLY A PART OF A PERSON, FROM EGOCENTRIC CAMERA(S)
300

INPUT IMAGE(S) INTO TRAINED MODEL
302

USE OUTPUT PREDICTED DISTRIBUTION OVER JOINT ROTATIONS AND/OR 3D LOCATIONS OF AT LEAST ONE JOINT OF THE PERSON FOR DOWNSTREAM PROCESSING
304

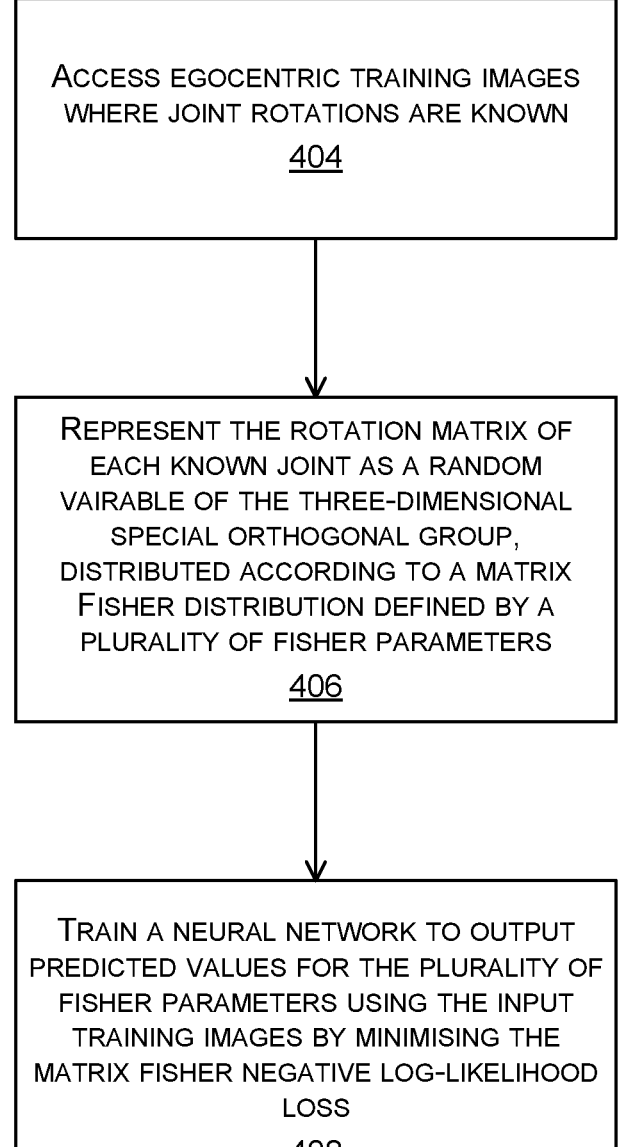

ACCESS EGOCENTRIC TRAINING IMAGES WHERE JOINT ROTATIONS ARE KNOWN
404

REPRESENT THE ROTATION MATRIX OF EACH KNOWN JOINT AS A RANDOM VAIRABLE OF THE THREE-DIMENSIONAL SPECIAL ORTHOGONAL GROUP, DISTRIBUTED ACCORDING TO A MATRIX FISHER DISTRIBUTION DEFINED BY A PLURALITY OF FISHER PARAMETERS
406

TRAIN A NEURAL NETWORK TO OUTPUT PREDICTED VALUES FOR THE PLURALITY OF FISHER PARAMETERS USING THE INPUT TRAINING IMAGES BY MINIMISING THE MATRIX FISHER NEGATIVE LOG-LIKELIHOOD LOSS
408

FIG. 4B

JOINT ROTATION/LOCATION FROM EGOCENTRIC IMAGES

BACKGROUND

Egocentric images are typically captured by an egocentric camera worn by a user. An egocentric camera is a camera that is mounted on the user and is oriented towards at least a portion of the body of the user. Typically, such a camera is downwards-facing and mounted on a head-mounted display (HMD), thereby capturing visual information from an egocentric viewpoint.

Obtaining rotations and/or locations of joints of a person from egocentric images depicting the person is useful for various tasks including telepresence, gesture recognition, avatar animation and more.

The examples described below are not limited to implementations which solve any or all of the disadvantages of known methods and apparatus for processing egocentric images.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a way of predicting the pose of a person using images from egocentric cameras in an accurate and compact way.

In various examples, an image from an egocentric camera is received, wherein the image depicts only a portion of a person. A trained neural network is used to directly predict a distribution over rotation of a joint of the person or three-dimensional, 3D, location of a joint of the person.

In various examples, a neural network is trained using supervised training to directly predict a distribution over rotation of a joint of a person or a distribution over three-dimensional location of a joint of a person, using a loss function. Training images are used which are egocentric images, wherein a training image depicts at least a portion of a person where joint rotations or three-dimensional (3D) joint locations of the person are known.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIGS. 4A and 4B are flow diagrams of example methods for training a neural network;

Like reference numerals are used to designate like parts in the accompanying drawings.

DETAILED DESCRIPTION

Figure 1:
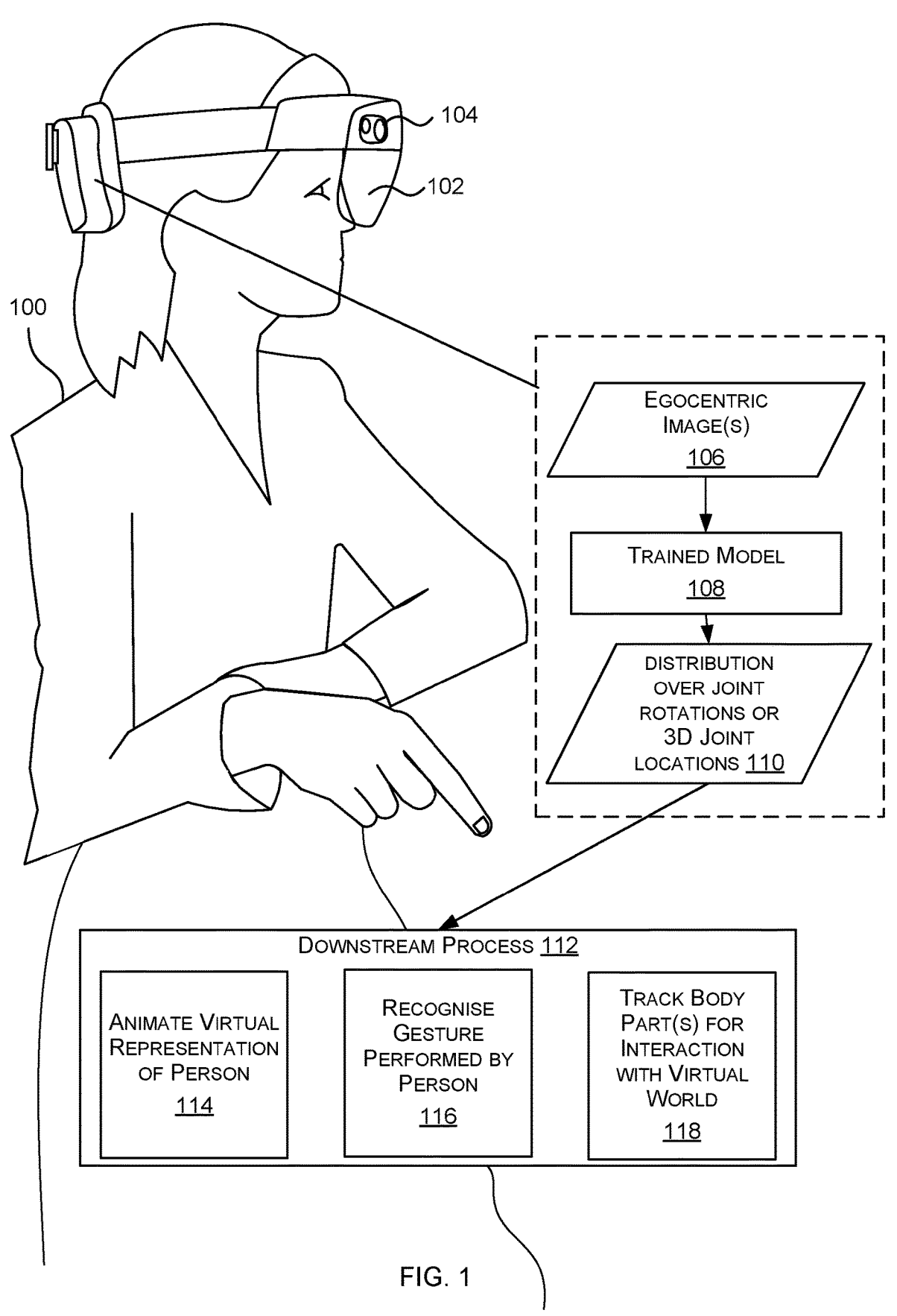
FIG. 1 is a schematic diagram of an HMD worn by a person and where the HMD comprises functionality to capture and process egocentric images.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

It is often useful, such as in animation or communication in virtual world scenarios, to represent a full body of a user in an accurate way. The body of a user may be represented as a three-dimensional (3D) model, wherein the 3D model of the user is 'posed' by adjusting joint locations and/or joint rotations of model joints representing the actual joints in the body of a user. The location and/or rotation of the model joints are capable of adjustment. In various examples, the 3D model comprises a mesh of primitive shapes. Recovering the joint locations and/or joint rotations of a user in order to accurately reflect their pose via a 3D model is a useful task as it facilitates telepresence, gesture recognition and other tasks.

The inventors recognize that in typical HMD setups, which, in various examples, include at least one egocentric camera, accurately recovering the body pose of a user from images is a challenging problem due to partial visibility of, and self-occlusion from, the full body of the user.

The technology described herein uses a trained neural network to predict a distribution over rotations of at least one joint and/or a distribution over three-dimensional locations of at least one joint of a person depicted in at least one image from at least one egocentric camera. An egocentric camera is a wearable camera that is oriented towards at least a portion of the body of the user. Such a camera, in various examples, is mounted to a head mounted display (HMD) worn by the user, and, for the purposes of obtaining information about the body of a user, is typically oriented looking downwards towards the body of the user. The egocentric camera, in various examples, comprises a fisheye lens. In other examples, the egocentric camera instead comprises a traditional rectilinear camera lens. Many combinations of lenses and types of single lens setups are possible and are well-known.

A joint rotation is a parameter or plurality of parameters that defines how a joint, such as one corresponding to a joint of a person, for example the wrist, is rotated. In various examples, a joint rotation is represented as a matrix in three dimensions, corresponding to the x, y and z-axis rotations of a joint. In various examples, only two axes of rotation are represented in a matrix, and in other examples, a single value is used to represent the rotation of a joint.

Similarly, a three-dimensional joint location is a parameter or plurality of parameters that defines where a joint, such as one corresponding to a joint of a person, is located with respect to a coordinate system such as a world coordinate system or a body coordinate system. In various examples, a three-dimensional joint location is represented as a vector in three dimensions, corresponding to a location along an x, y and z axis. In various examples, other coordinate systems are used, such as cylindrical coordinates, which are well-known.

Neural networks are well-known, and commonly comprise an input layer, at least one hidden layer, and an output layer, wherein each layer is comprised of at least one node. They are trained on images for which the desired output is known, wherein training comprises the input of training images and the 'learning' of weights which correspond to how heavily to utilize a node input to a subsequent layer. Commonly, 'learning' comprises determining the weights that minimize a function defined as the 'loss'. There are many possible loss functions, some of which are well-known. The choice of loss function depends on the context of use of a neural network.

The inventors have recognized that accurately computing pose (i.e. 3D position and orientation) of a person's body parts from egocentric images is extremely difficult. Because the images are egocentric there is typically only a partial view of the person and yet, for full body pose, the 3D positions and orientations of a plurality of joints in a model of the person are to be found. Predicting the pose of a person from images from an egocentric camera is useful in animation or virtual world communication scenarios, wherein representing the full body of a user in an accurate way is beneficial, but wherein the full body of the user is not entirely visible to the egocentric camera. The term "pose" is used to refer to 3D position and orientation of body parts of a person, including a plurality of joints. An accurate pose of a person is useful, for example, in animating a three-dimensional model of a person based on the movement of a real person. In virtual world communication scenarios, such as when a first user wishes to talk to or otherwise communicate with a second user via a virtual world, accurately representing the full body of the first user improves the ability of the first user to convey meaning in the virtual world. Additionally, obtaining uncertainty associated with a predicted pose is useful, for example in scenarios wherein gesture tracking is performed, and wherein an uncertainty would allow the deciding of whether or not to accept a gesture comprising predicted motions i.e. predicted pose over time.

Images received from an egocentric camera, as mentioned above, present a challenging problem for obtaining the pose of a person due to partial visibility of, and self-occlusion from, the full body of the user.

One approach to obtaining pose from an egocentric camera is the use of a fisheye lens, which has a wider view than a conventional rectilinear lens. However, fish-eye lenses are not well-suited for HMDs as they require protrusions from the device, and they do not solve the problem of self-occlusion. Moreover, images from fish-eye lenses are heavily distorted, affecting the ability of neural networks to learn information about their content.

One approach to predicting pose is the prediction of joint locations including self-occluded joints, providing three-dimensional skeletal joint locations. However, these joint locations are not well-suited to drive (i.e. animate) an avatar.

Another approach to egocentric pose estimation uses predicted two-dimensional (2D) heat-maps of joint locations thereby capturing uncertainty of each joint in an image, and uses an encoder-decoder model to predict 3D joint positions.

However, this method is computationally expensive, introduces extra parameters that are required to be tuned, and does not capture uncertainties of joints falling outside an image.

Alternative approaches wherein a parametric 3D model is fit to predicted 3D points are slow, prone to error, and require a large amount of manual tuning.

The present technology provides an accurate way to predict the pose of a person from at least one image obtained via at least one egocentric camera. Directly predicting a distribution over joint rotations and/or three-dimensional locations results in a compact, relatively computationally inexpensive method of predicting pose. Uncertainties are able to be obtained for every joint, including those that, in various examples, lie outside of an image. Joint rotations are able to be obtained, which are suitable for downstream processing applications, such as driving 3D avatars.

The present technology further provides a method of training a neural network so as to facilitate the prediction of pose described above.

FIG. 1 is a schematic diagram of an HMD 102 worn by a person 100 and where the HMD 102 comprises functionality to process egocentric images of the person. Within the HMD is functionality for implementing a method depicted by the flow diagram in the dotted box. In various examples, the method is implemented in the HMD comprising a processor and a memory storing instructions that, when executed by the processor, perform the method. However, it is not essential to deploy the method in an HMD. In various examples, the method is deployed as a web service accessible to the HMD or other computing entities. In various examples, the method is deployed at a personal computer or other computing device which is in communication with a head worn computer such as HMD 102. In various examples the method is deployed in a companion computing device of HMD 102. In various examples, the method comprises only the blocks 106-110.

The person 100 is wearing an HMD 102 comprising an egocentric camera setup 104. In various examples, the egocentric camera setup 104 comprises egocentric cameras that are oriented downwards, so as to capture the body of the person 100. In various examples, the egocentric camera setup comprises a single camera. In other examples, the egocentric camera setup comprises two or more cameras.

The input 106 to the method of FIG. 1 comprises an image taken by the egocentric camera 104. In various examples, the image taken by an egocentric camera is received or accessed and is not taken by a camera associated with the device, apparatus or system capable of implementing the method.

Figure 4A:
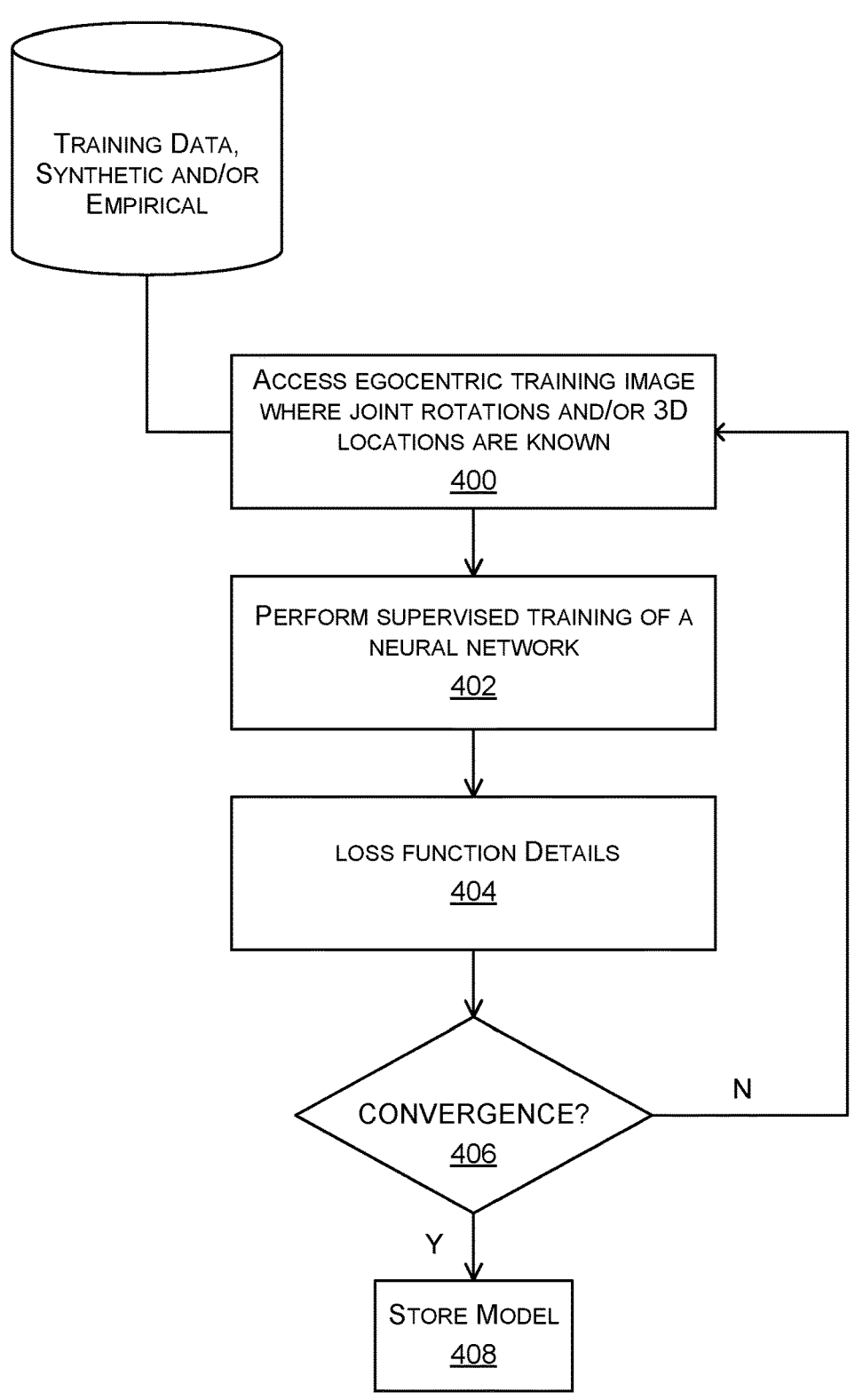

This image is input to a trained model 108, wherein the trained model 108 is trained to directly output 110 a distribution over joint rotations or 3D joint locations of a 3D model of the person 100. In various examples, the trained model is trained to directly output a distribution over joint rotations and 3D joint locations of a 3D model of the person 100. The trained model 108 comprises a neural network. FIG. 4A illustrates a method by which the neural network in the trained model 108 is trained.

Direct output and direct prediction of the trained model are defined herein to refer to output and prediction of the model, wherein the trained model comprises a single trained neural network and wherein the single trained neural network is used to output a prediction without needing to pass the output of the single neural network into an additional neural network or optimization step.

The output 110 of the trained model may be used in a downstream process 112, comprising one or more of: animating 114 a virtual representation of the person 110, wherein the animation accurately reflects the person's 110 actual movements; recognizing a gesture 116 performed by the person 110, wherein the gesture is accurately determined to be occurring; tracking 118 at least one body part of the person 110 for interaction with a virtual world, wherein the at least one body part is accurately predicted. In various examples, tracking at least one body part comprises tracking the hands, body and/or any other body part. Body part refers to a portion of a body, and includes joints, limbs and any other portion of a body. A downstream process and downstream processing are defined herein as steps subsequent to the method of predicting pose corresponding to the method of 106-110.

In various examples, the method 106-110 is implemented by an apparatus comprising a processor and a memory storing instructions that, when executed by the processor, perform the method 106-110. In various examples, additionally, the block 112 is performed.

The method 106-110 operates in an unconventional manner by directly predicting a distribution over joint rotations or 3D joint locations to enable the prediction of a pose of a person from an egocentric image accurately. In various examples, the trained model 108 directly predicts a distribution over joint rotations and 3D joint locations, with the same effect. Many alternative methods of pose prediction from egocentric images are inaccurate, slow, and require extensive tuning. By predicting distributions rather than predicting single values it is possible to gain information about uncertainty of the prediction. The uncertainty information is extremely useful to guide operations.

The method 106-110 improves the functioning of an underlying computing device by enabling the accurate prediction in a compact, efficient way, of a pose of a person from an egocentric image depicting only a portion of the person.

Alternatively, or in addition, the functionality of the method 106-110 or 106-112 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
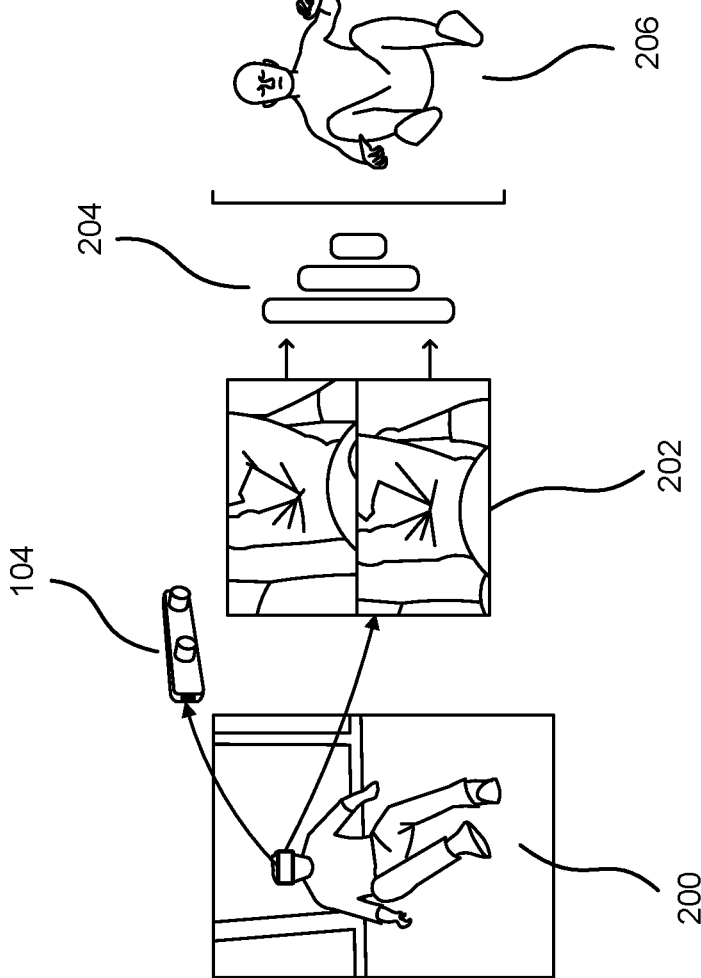
FIG. 2 is a schematic diagram of processing egocentric images to predict information about joints of a person depicted in the images.

FIG. 2 is a schematic diagram of processing egocentric images to predict information about joints of a person depicted in the images. FIG. 2 is a representation of a method such as that described with reference to FIG. 1. A stage 200 demonstrates a user wearing an HMD upon which there is mounted an egocentric camera setup 104, as in FIG. 1. In this example, the egocentric camera setup comprises two cameras in order to provide a pair of stereo images 202. Both cameras are oriented downwards so as to capture the user's body.

A pair of stereo images 202 is captured and is received, before being input into a trained model 204. The model comprises a neural network. FIG. 4 illustrates a method by which the neural network, in various examples, is trained. In various examples, only a single mono image is captured and is received. In various examples, the stereo or mono images are received or accessed and are not taken by a camera system associated with the device, system or apparatus capable of implementing the method.

The output of the trained model 204 includes a predicted distribution over joint rotations and/or 3D joint locations. The output distribution or distributions are used to determine values of parameters of a 3D model of a generic person. In various examples, the 3D model of the user 206 is a parametric human model adjusted such that parameters of the parametric human model are defined by the distribution over joint rotations and/or 3D locations output by the trained model 204. A parametric human model is a model of a person wherein joints of the person are parametrized and are capable of adjustment, and wherein a kinematic tree is represented. For example, a parametric human model, in various examples, is a 3D model of a person wherein each joint is capable of being positioned and/or rotated and wherein a rotation and/or location of a joint determines a rotation and/or location of other joints in the kinematic tree that would be affected by the joint rotation and/or location of a real person. A non-exhaustive, non-limiting list of parametric human models which may be used is: skinned multi-person linear model (SMPL and extensions SMPL-H, SMPL-X), GHUM(L).

Additionally, the trained model 204, in various examples, outputs one or more statistical measures describing the predicted distribution over joint rotations and/or 3D joint locations. In an example, the statistical measures are a mean and a standard deviation. These statistical measures, in various examples, include at least one uncertainty or measure of uncertainty, such as a per-joint rotation uncertainty 208. In various examples, the trained model outputs a plurality of per-joint uncertainty values. Additional uncertainties, in various examples, are derived from the output statistical measures of the trained model 204, such as a per-vertex uncertainty 210. In various examples, these statistical measures are used in downstream processes such as those outlined in FIG. 1, and are, for example, used to decide whether to take a predicted pose over time as the performing of a gesture.

For example, consider a situation wherein a user moves their hands inside and outside of the field-of-view of an egocentric camera mounted to an HMD. A gesture is defined as a specific hand movement and is designed to trigger a subsequent operation. In examples where a pose predicted by the method outlined thus far in FIG. 2 results in the specific hand movement, but wherein a measure of uncertainty associated with, for example, the pose, the joints in the hand or the vertices in the hand is greater than a threshold uncertainty, the predicted gesture will not trigger the subsequent operation. In contrast, if a measure of uncertainty is smaller than a threshold uncertainty, the predicted gesture will trigger the subsequent operation. As such, the statistical measures that in various examples are output by the trained model 204 are useful for downstream processing.

Figure 3A:
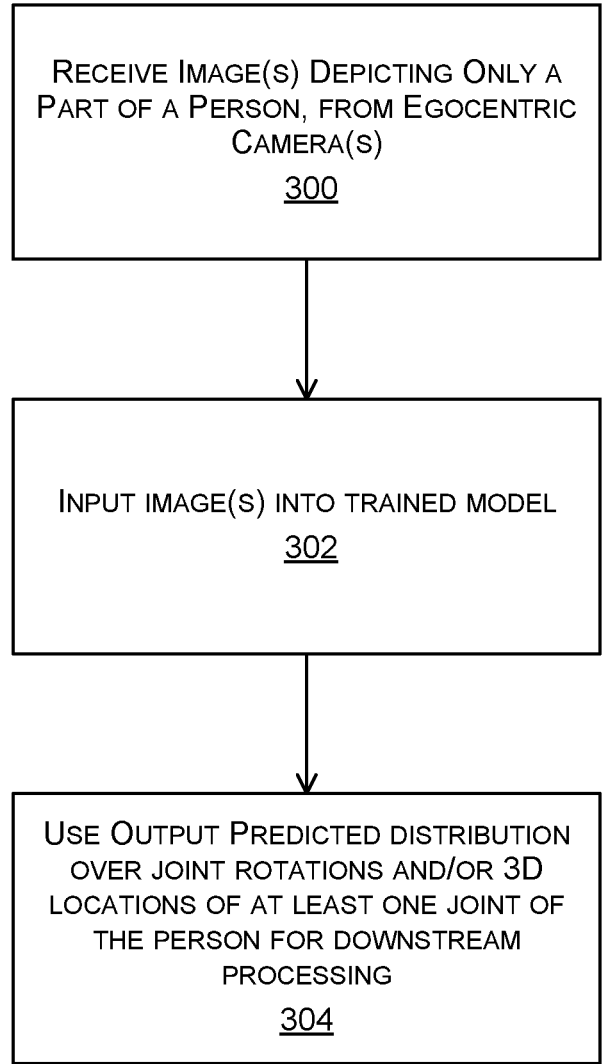
FIGS. 3A and 3B are flow diagrams of example methods of processing egocentric images.

FIG. 3A is a flow diagram of a method of predicting a distribution over a joint rotation and/or a distribution over a joint location. FIG. 3A is a flow diagram of the blocks of a method according to an example. At least one image depicting only a part of a person from at least one egocentric camera is received 300. The received image is input into a trained model 302, wherein FIG. 1 and FIG. 2 provide examples of a method incorporating such a trained model. The trained model 302 comprises a neural network which outputs a predicted distribution over joint rotations and/or 3D locations of at least one joint of the person. This predicted distribution may be used for downstream processing 304, such as the downstream processing of FIG. 1.

Figure 3B:
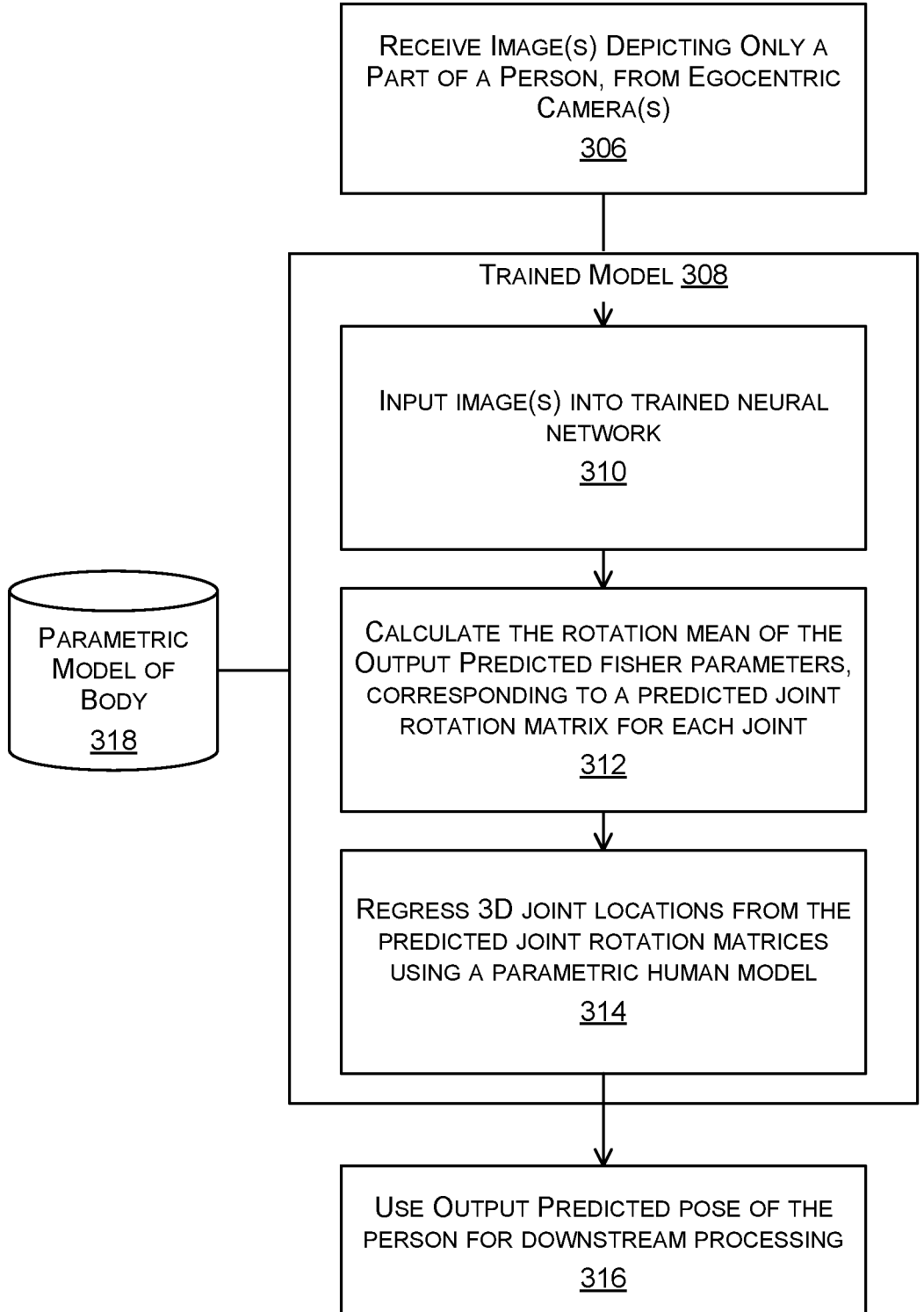

FIG. 3B is a flow diagram of the blocks of a method for predicting a pose of a person, according to an example. At least one image depicting only a part of a person from at least one egocentric camera is received 306. This at least one image is input into a trained model 308, in which the at least one image is input into a trained neural network 310.

The trained neural network 310 is trained to output predicted Fisher parameters for at least one predicted joint, wherein the Fisher parameters are parameters defining a Fisher distribution. In various examples, the Fisher distribution is a matrix Fisher distribution. In various examples, a matrix Fisher distribution is defined over the three-dimensional special orthogonal group, by nine parameters:

$$p(R_i | F_i) = \frac{1}{c(F_i)} \exp\left(tr(F_i^T R_i)\right) \tag{1}$$

$$c(F_i) = \int_{R \in SO(3)} \exp\left(tr(F_i^T R_i)\right) dR$$

wherein $R = \{R_i\}_{i=1}^N$ are N joint rotations corresponding to the N predicted joint rotations (where N is at least 1) and wherein each joint is represented as a rotation matrix with a random variable $R_i \in SO(3)$ of the three-dimensional special orthogonal group (SO(3)). The Fisher parameters $F = \{F_i\}_{i=1}^N$ are represented by a function f, such that $F = f(X; W)$, wherein X represents the input image data and $R = p(R|X)$. $c(F_i)$ is the distribution normalizing constant, and $F_i \in \mathbb{R}^{3 \times 3}$.

The distribution normalizing constant $c(F_i)$ is defined in Eq. 1 above, wherein the integral is calculated via approximation. In various examples, a gradient descent method is used. In other examples, the integral of Eq. 1 is expressed as an integral over Bessel functions and approximated using the trapezoid rule.

In this example, f is represented by a neural network 310 with weights W, and the matrix Fisher distribution is rewritten as $p(R|F) = p(R|f(X)) = p(R|X)$. As such, the neural network, when trained, outputs predicted Fisher parameters F, thereby directly predicting a distribution over joint rotations for at least one predicted joint.

The output predicted Fisher parameters are used to calculate a rotation mean corresponding to a predicted joint rotation matrix for each joint. The properties of the distribution for each joint are obtained by computing the singular value decomposition (SVD) of the Fisher parameters $F_i$: $F_i = U_i' S_i' V_i'^T$ where $S_i' \in \mathbb{R}^{3 \times 3}$ is a diagonal matrix with singular values $S_{i,1}' \geq S_{i,2}' \geq S_{i,3}' \geq 0$ and $U_i'$, $V_i' \in \mathbb{R}^{3 \times 3}$ are orthonormal matrices. As the determinant of $U_i'$ or $V_i'$ can be $-1$, the matrices are not necessarily elements of SO(3). Thus, a proper SVD, $F_i = U_i S_i V_i^T$ is defined, where:

$$U_i = U_i' \, \text{diag}\,(1, 1, \det(U_i')) \tag{2}$$

$$S_i = \text{diag}\,(S_{i,1}, S_{i,2}, S_{i,3}) = \text{diag}\,\left(S_{i,1}', S_{i,2}', \det(U_i' V_i') S_{i,3}'\right)$$

$$V_i = V_i' \, \text{diag}\,(1, 1, \det(V_i'))$$

This ensures that $U_i$ and $V_i \in SO(3)$ and allows the computing of the rotation mean $\hat{R}_i = U_i V_i^T$ where each column of $U_i$ is considered as the principal axis of rotation of the distribution. As mentioned above, calculating the rotation mean of the predicted Fisher parameters corresponds to calculating a predicted joint rotation matrix for each joint 312. A distribution of joint rotations over the at least one predicted joint is therefore calculated.

In various examples, formulations of the problem other than that outlined in relation to a matrix Fisher distribution are used. In various examples, other probabilistic formulations are used. In various examples, the trained neural network is trained to output the rotation mean directly. In various examples, the parameters of the rotation distribution for at least one predicted joint are output, including a mean and an uncertainty. In various examples, the directly output rotation mean is one of: a rotation matrix, at least one axis angle, at least one Euler angle, a quaternion.

Additionally, 3D joint locations of the at least one predicted joint are calculated by regressing 3D joint locations from the predicted joint rotation matrices using a parametric human model 314. As such, a distribution over 3D joint locations of the at least one predicted joint is output by the trained model 308. In various examples, only a distribution over joint rotations is output. In various examples, only a distribution over 3D joint locations is output.

The predicted body pose output by the trained model 308, in various examples includes one or more of: a distribution over 3D joint locations; a distribution over joint rotations; and a rotation mean. The distributions and the rotation mean are defined for each joint of the at least one predicted joint.

The output predicted body pose is then used for downstream processing 316, which, in various examples, includes the downstream processing of FIG. 1.

In various examples, the output predicted body pose includes or is associated with an uncertainty. The output predicted body pose in various examples, additionally or alternatively, includes or is associated with a concentration, wherein a concentration is defined herein as the inverse of an uncertainty i.e. 1/uncertainty.

In various examples, with the proper singular values $S_i$ in Eq. 2 above, the concentration for joint i, $k_{i,j}$ around principal axis j is obtained by $k_{i,j} = s_k + s_l$ for (j, k, l) $\in$ {(1,2,3), (2,1,3), (3,1,2)}. In various examples, the concentration is different about each principal axis, allowing the modelling of rotational uncertainty per-axis.

FIGS. 4A and 4B are flow diagrams of methods for training a neural network such as those discussed thus far in FIG. 1-3B. FIG. 4A is a flow diagram of a method according to an example. Training image data is accessed 400, wherein the training images are images from egocentric cameras i.e. egocentric images, and wherein joint rotations and/or 3D locations are known. At least one joint rotation and/or 3D location is known. The training image data is synthetic and/or empirical data. In the case of synthetic data, a 3D model of a person is used together with a model of an egocentric camera. Using ray tracing or equivalent techniques synthetic egocentric images are computed when parameter values of the 3D model are known. This process is repeated for many different values of the parameters of the 3D model and egocentric camera model in order to obtain a wide range of egocentric images. In the case of empirical training images, real people wearing egocentric cameras are used. In order to obtain ground truth values of the joint positions and joint rotations of the people, various options are used such as using body worn accelerometers or other sensors on joints of the body such as the knees, shoulders, wrists, or by using depth and/or conventional images of the person from one or more cameras mounted around the person to compute the 3D joint locations.

Supervised training of a neural network is then performed 402 using the accessed training image data. Supervised training is well-known, and comprises processing individual training examples through the neural network to obtain predictions. For each prediction there is a corresponding ground truth value known from the training example. An error or loss between the prediction and corresponding ground truth value is computed and used to determine how to update weights of the neural network so as to try to reduce the error.

Supervised training is performed using a loss function, with the aim of optimising the weights of the neural network so as to minimise the loss function. There are many choices of loss function, and the accuracy of the neural network in making predictions depends significantly on the choice of such a loss function.

In the case of an example such as that described in FIG. 3B, wherein the neural network is trained to predict Fisher parameters of a matrix Fisher distribution, the matrix Fisher negative log-likelihood loss $\mathcal{L}_{FNLL}$ is, in various examples, used as the loss function, wherein the variables are as defined as in Eq. 1, and wherein N is the number of predicted joints:

$$\mathcal{L}_{FNLL} = -\sum_{i=1}^{N} \log(p(R_i|F_i)) = \sum_{i=1}^{N} \log(c(F_i)) - tr(F_i^T R_i) \quad (3)$$

Equation 3 is expressed in words as the matrix Fisher negative log-likelihood loss $\mathcal{L}_{FNLL}$ is equal to the sum over the number of joints of a person to be predicted, of the logarithm of the probability distribution corresponding to the matrix Fisher distribution parameterised by a joint rotation matrix and a matrix of Fisher parameters for each joint of the joints of a person to be predicted, is equal to the sum over the number of joints of a person to be predicted of the logarithm of the distribution normalising constant of the matrix Fisher distribution for each joint of the joints of a person to be predicted minus the trace of the transpose of the matrix of Fisher parameters multiplied by the joint rotation matrix for each joint of the joints of a person to be predicted. The inventors have found empirically that using equation 3 as the loss function gives particularly accurate results as explained below.

The matrix Fisher negative log-likelihood loss is probabilistic. In various examples a probabilistic distribution loss that is not the matrix Fisher negative log-likelihood loss is used. Alternatively, in various examples, the summation of the matrix Fisher negative log-likelihood loss $\mathcal{L}_{FNLL}$ and an L2 loss supervising 3D joint positions $\mathcal{L}_J$ is used as the loss function $\mathcal{L}$, wherein:

$$\mathcal{L} = \mathcal{L}_{FNLL} + \mathcal{L}_J \quad (4)$$

$$\mathcal{L}_J = \left\| J_{3D}(\hat{R}) - J_{3D}(R) \right\|_2^2$$

In this example, $J_{3D}$ are 3D joint locations regressed from the means of the predicted matrix Fisher distributions $\hat{R}$ and known joint rotations R. Equation 4 is expressed in words as the loss function $\mathcal{L}$ is equal to the sum of the matrix Fisher negative log-likelihood loss and an L2 loss supervising 3D joint positions, wherein the L2 loss supervising 3D join positions is the squared two-norm of predicted joint locations minus ground truth joint locations.

In various examples, a parametric human model is used to regress the 3D joint locations from the predicted joint rotations and known joint rotations. In various examples, a linear regression is used as the regression method using the parametric human model. In various examples, the parametric human model has at least one body shape parameter. In various examples, the at least one body shape parameter is taken to be a default value during regression. In other examples, the neural network is trained to learn the at least one body shape parameter by using a negative log-likelihood loss $\mathcal{L}_\beta$ over the distribution of the at least one body shape parameter β:

$$\mathcal{L}_\beta = -\log\left(\mathcal{N}\left(\beta; \mu_\beta(X), \text{diag}\left(\sigma(X)_\beta^2\right)\right)\right) \quad (5)$$

$\mu_\beta(X)$ is the mean of the body shape parameter predicted from training images, $\sigma(X)_\beta^2$ is the co-variance of the body shape parameter predicted from training images, β is a known body shape parameter and $\mathcal{N}$ is a normal distribution. Equation 5 is expressed in words as the negative log-likelihood loss over the distribution of body shape parameters $\mathcal{L}_\beta$ is equal to the negative logarithm of a normal distribution parameterised by the known body shape parameter, the mean of the body shape parameter predicted from training images, and the diagonal of the co-variance matrix of the predicted body shape parameter from training images.

In various examples, only a loss supervising 3D joint positions is used as the loss function. In various examples, the 3D joint positions are probabilistic. In various examples, only the L2 loss supervising 3D joint positions $\mathcal{L}_J$ is used as the loss function. In various examples, only a loss supervising 2D joint positions is used as the loss function. In various examples, the 2D joint positions are probabilistic. In various examples, the loss function includes a loss supervising probabilistic joint rotations. In various examples, the loss supervising probabilistic joint rotations is the matrix Fisher negative log-likelihood loss. In various examples, a loss supervising at least one parameter of the predicted distribution, such as a mean and/or an uncertainty value directly output by the neural network is used as the loss function.

In various examples, the loss function is an L2 loss supervising 2D joint locations in a 2D image plane of each image of the training images, wherein the predicted 3D joint locations are converted into 2D image plane locations by projecting them onto an image plane using camera parameters:

$$\hat{J}'_{2D} = C[R|t]\hat{J}_{3D} \quad (6)$$

wherein C are the intrinsic camera parameters and [R|t] are the rotation and translation of the camera. Equation 6 is expressed in words as the projected to 2D predicted joint location is equal to the intrinsic camera parameters multiplied by a matrix defining the rotation and translation of the camera multiplied by the predicted 3D joint location. In various examples, the L2 loss supervising 2D joint locations is defined as the reprojection error:

$$\mathcal{L}_{reproj} = \sum_{i=1}^{N} \left\| v_i\left(\hat{J}'_{2D_i} - J_{2D_i}\right) \right\|_2^2 \quad (7)$$

In this example, $\hat{J}_{2D_i}'$ are the projected $\hat{J}_{3D}$ predicted 3D joint locations, $J_{2D_i}$ are the known 2D joint locations, and $v_i$ is 1 if the joint i is inside the image frame and 0 otherwise. Equation 7 is expressed in words as the reprojection error $\mathcal{L}_{reproj}$ is equal to the sum over the number of joints of a person to be predicted of the squared two-norm of a variable $v_i$ which is 1 if the joint of the joints of a person to be predicted is inside the image frame and 0 otherwise, multiplied by the known 2D location of the joint subtracted from the projected to 2D predicted joint location of the joint of the joints of a person to be predicted.

It is stressed that there are many loss functions that may be chosen for the training of the claimed neural network. The training, and the minimization of the loss function, are repeated until convergence 406. In various examples, convergence 406 represents the weights of the neural network reaching a steady state and not substantially changing. Alternatively, in various examples, convergence 406 represents the point at which the loss function does not decrease substantially further or where a specified number of training examples have been processed. The choice of convergence metric is variable and depends on the context of use of the neural network, alongside the desired accuracy.

After convergence 406, the trained model is stored 408. In various examples, the trained model is stored on at least one computer-readable medium. The stored trained model, in various examples, is accessed or retrieved for use in predicting any of: joint position, joint rotation, pose via the methods discussed herein.

FIG. 4B is flow diagram of a method for training a neural network such as that described in FIG. 3B or that is in various examples, applied in FIG. 1-3A. Egocentric training images i.e. images taken via an egocentric camera, wherein joint rotations of a person depicted in the egocentric training images are known, are accessed 404. In various examples, at least one joint rotation of the person is known. In various examples, additionally or alternatively, at least one 3D joint location of the person is known. In various examples, the egocentric training images depict only a portion or part of the person. In various examples, the egocentric training images depict at least a portion or part of the person. In various examples, the egocentric training images include at least one image which does not depict any part of the person.

The rotation matrix of each known joint is represented 406 as a random variable of the three-dimensional special orthogonal group, distributed according to a matrix Fisher distribution defined by a plurality of Fisher parameters, as in Eq. 1. In various examples, alternatively, the rotation matrix of each joint to be predicted is represented as a random variable of the three-dimensional special orthogonal group, distributed according to a matrix Fisher distribution.

A neural network is then trained to output 408 predicted values for the plurality of Fisher parameters using the input training images, by minimising a matrix Fisher negative log-likelihood loss, as defined in Eq. 3 above. The neural network undergoes supervised training, wherein the weights of the neural network are optimised so as to minimise a loss function based on at least one predicted and known joint rotation. In various examples, additionally or alternatively, predicted and known 3D joint locations are used.

Figure 5:
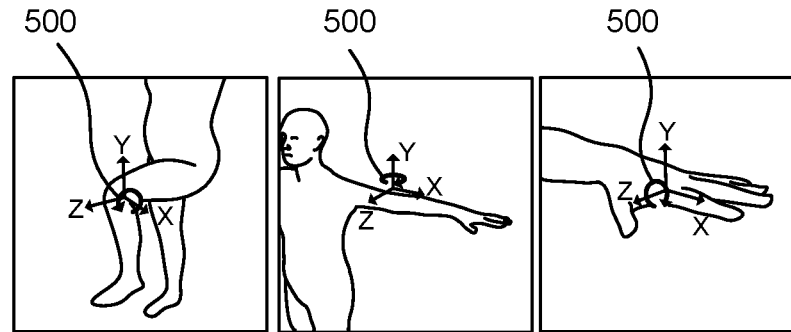
FIG. 5 shows an exemplary chart of concentration against joint and axis from an example, and a depiction of the axes around which specific joints are able to rotate naturally.
Figure 5:
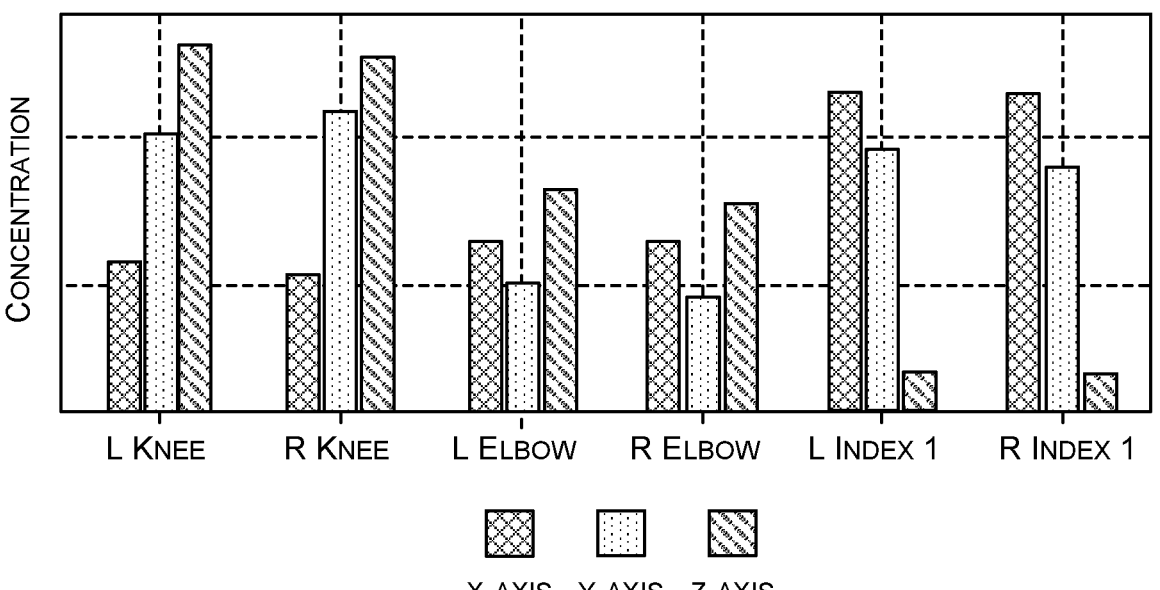

FIG. 5 shows an exemplary chart of concentration against joint and axis of rotation for an example in which a matrix Fisher negative log-likelihood and an L2 loss supervising 3D joint locations, as in Eq. 4, is used. In this example, a neural network is trained to predict Fisher parameters of a matrix Fisher distribution over joint rotations for each predicted joint.

Concentration is obtained in various examples, as described above, as an output of the trained model described herein, and is useful for downstream processing such as the processes described in FIG. 1. The chart shows that higher concentration parameters are correlated with axes of rotation that have lower freedom. The arrow 500 shows the principal axis of rotation of the joints, and corresponds, as shown by the chart, to the axis with the highest concentration. The highest concentration corresponds to the lowest uncertainty.

For example, it is clear in the diagram of the knee, that rotation about the z-axis would be restricted for a real person. In the chart, the concentration is higher for z-axis predicted joint rotation for the knee than for axes with less restricted rotation, such as about the x-axis. As such, the trained model described herein is capable of learning the degrees of freedom of each predicted joint without being explicitly encouraged to do so. In this example, the trained model has learned the degrees of freedom of each predicted joint without being explicitly encouraged to do so.

Whilst the predicted uncertainty and/or concentration estimates are local to each joint, the estimates, in various examples, are extended to the entire body by propagating the joint uncertainties and/or concentrations through the kinematic tree of the human body. This allows the evaluation of the uncertainty and/or concentration of the entire pose, as the position of a joint is affected by everything above it in the kinematic tree.

In various examples, the concentration of a predicted joint rotation is calculated by summing the concentration parameters over all of the predicted axes.

In various examples, a per-vertex uncertainty is calculated, which reflects the estimated variance of each body part in Euclidean space. In various examples, a plurality of parametric human model meshes are sampled from a predicted matrix Fisher distribution obtained by a trained neural network. The average Euclidean distance from the sample mean for each vertex over all of the samples of the plurality of parametric human model meshes is then obtained, and the standard deviation of each vertex calculated. Given that this uncertainty takes into consideration the kinematic tree of the body, as the rotation of parent joints affects the final position of their children and the vertices that correspond to them, this type of uncertainty is useful for downstream processing as described herein.

Figure 6:
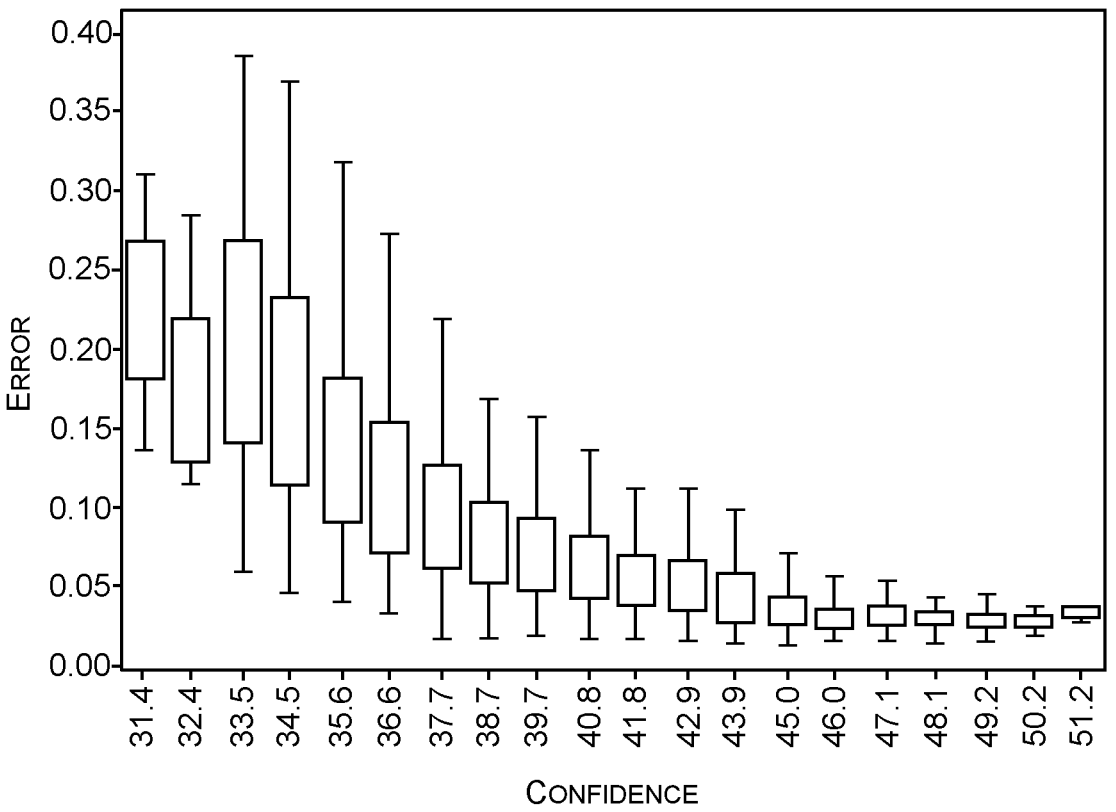
FIG. 6 shows a chart of prediction error against confidence for joints in a human body.

FIG. 6 shows a chart of prediction error for all predicted joints against confidence for all predicted joints for an example in which a matrix Fisher negative log-likelihood and an L2 loss supervising 3D joint locations, as in Eq. 4, is used. In this example, a neural network is trained to predict Fisher parameters of a matrix Fisher distribution over joint rotations for each predicted joint from different input egocentric images.

It is clear that a high error corresponds to a low confidence, and vice-versa. This is useful for downstream processing, such as the processes described in FIG. 1, as predicted uncertainties behave in line with the expected error. For example, a predicted joint rotation with a higher uncertainty compared to a threshold, in various examples, is not be used for a downstream processing task as the error on the prediction is likely to be high, whereas a predicted joint rotation with a lower uncertainty compared to a threshold, in various examples, is used for a downstream task. Similarly, predicted joint locations have associated uncertainties, concentrations, and advantages when predicted via the trained model described herein.

The present technology has been tested empirically, including on synthetic data.

For the experiment, a ResNet-34 backbone was used for the neural network of the method described herein, and Fisher parameters for each joint of the parametric human body model were predicted. For stereo images, a Siamese network with shared weights was used, alongside late fusion by concatenating the features of both streams. The neural network was trained using PyTorch (trade mark) and the Adam optimiser with a learning rate of 5e-4, batch size of 128, and training for 200 epochs. 3D joint locations were regressed from the predicted rotations produced by the method described herein. A loss function of the summation of the matrix Fisher negative log-likelihood loss and an L2 loss supervising joint locations, as in Eq. 4 above, was used during training.

A synthetic data set based on a parametric human body model was generated, wherein pose parameters and joint locations are known. 60K stereo pairs of images were generated with a random selection of identities, clothing, environments and poses. Each image in a stereo pair had a resolution of 1280×720 pixels. A camera was positioned on the front of the forehead of the parametric body model looking down at the body, using a pinhole camera model. Uniform noise within 1 cm to the location and 10 degrees around all axes to the rotation of the camera was added to simulate the misplacement and movement of an HMD on the head of a person. The resulting synthetic images are typically challenging for pose estimation as many parts of the body are often not seen by the camera.

The synthetic dataset was split into 45K frames for training, 5K frames for validation and 10K frames for testing. For synthetic data and stereo frames, mean per-joint position errors in mm of the upper body, lower body, hands and all joints of 62.08, 86.51, 153.80 and 117.11 respectively were obtained. In contrast, an alternate approach referred to as UnrealEgo (trade mark), produced mean per-joint position errors of 65.10, 165.32, 174.81 and 142.76 mm respectively, for the same synthetic data. It is clear that the present method provides a more accurate prediction of joint position than an alternate approach.

Additionally, multiple variations of the loss function, monocular images instead of stereo, and parametric human model body shape prediction result in lower mean per-joint position errors of the lower body than alternate approaches.

Figure 7:
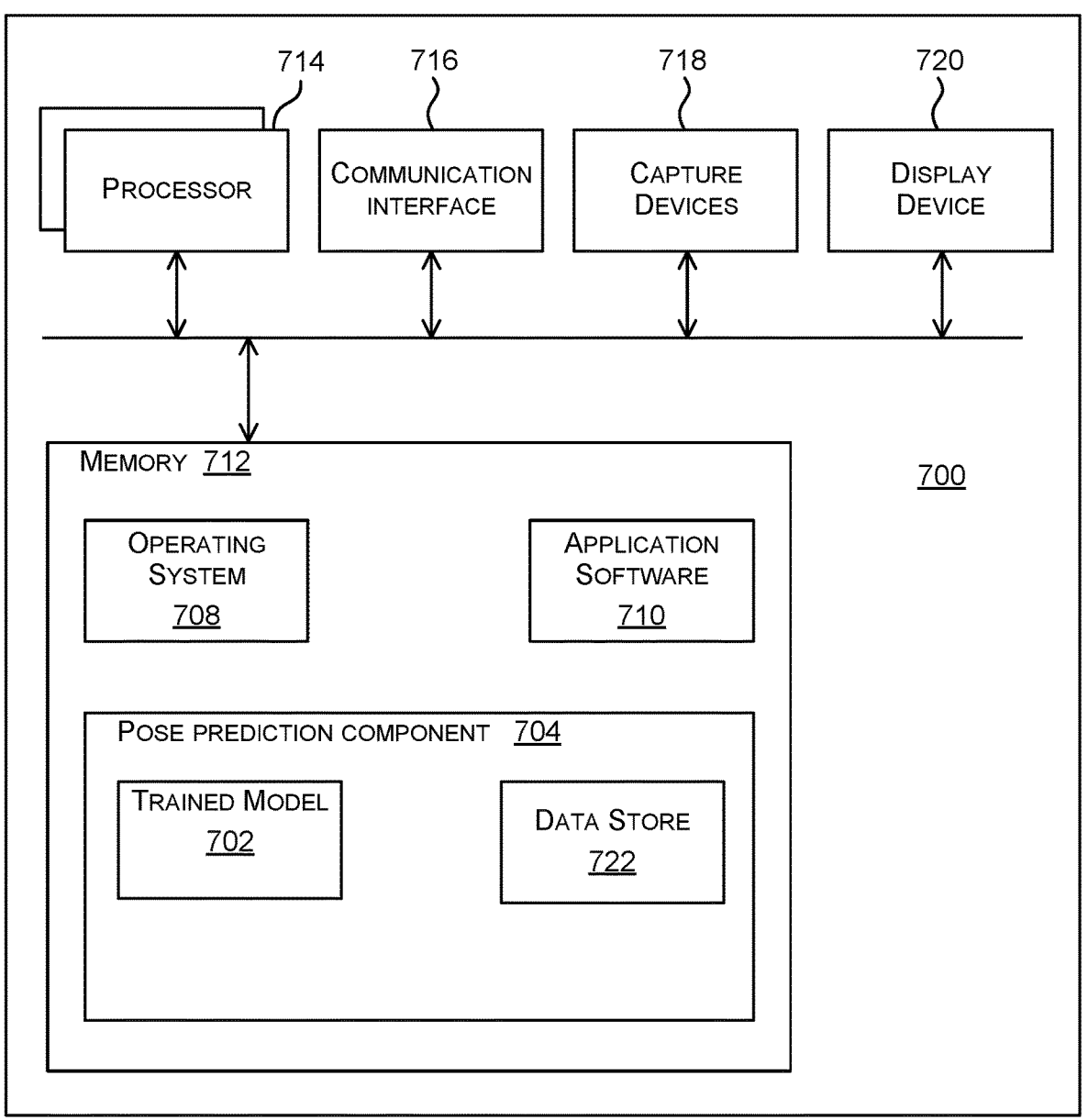
FIG. 7 illustrates an exemplary computing-based device in which examples of a pose prediction component for predicting the pose of a person from an egocentric image are implemented.

FIG. 7 illustrates an exemplary computing-based device 700 which is implemented as any form of a computing and/or electronic device, and in which examples of a prediction component for predicting the joint position, joint rotation, or pose of a person from an egocentric image are implemented in various examples.

Computing-based device 700 comprises one or more processors 714 which are microprocessors, controllers or any other suitable type of processors for processing computer executable instructions to control the operation of the device in order to predict the joint position, joint rotation or pose of a person from an egocentric image in an accurate manner. In various examples, for example where a system on a chip architecture is used, the processors 714 include one or more fixed function blocks (also referred to as accelerators) which implement a part of the method of any of FIG. 1-4B in hardware (rather than software or firmware). Platform software comprising an operating system 708 or any other suitable platform software is provided at the computing-based device to enable application software 710 to be executed on the device. A pose-prediction component 702 comprises a data store 722 that holds one or more of: input images, model parameters, parametric human model data and training images. The pose prediction component further comprises a trained model 702.

The computer executable instructions are provided using any computer-readable media that is accessible by computing based device 700. Computer-readable media includes, for example, computer storage media such as memory 712 and communications media. Computer storage media, such as memory 712, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 712) is shown within the computing-based device 700 it will be appreciated that the storage is, in various examples, distributed or located remotely and accessed via a network or other communication link (e.g. using communication interface 716).

The computing-based device 900 has at least one optional capture device 718 to enable the device to capture sensor data such as images and videos. In various examples, the at least one optional capture device 718 is at least one egocentric camera. In various examples, the at least one egocentric camera is used to obtain images of only a part of a person. The computing-based device 700 has an optional display device 720 to display output images and/or values of parameters.

Alternatively, or in addition to the other examples described herein, examples include any combination of the following clauses:

Clause A. An apparatus comprising: a processor; a memory storing instructions that, when executed by the last one processor, perform a method for predicting a pose of a person, comprising:
receiving an image from an egocentric camera, the image depicting only a portion of the person; and
using a trained neural network to directly predict a distribution over rotation of a joint of the person or three-dimensional, 3D, location of a joint of the person.

Clause B. The apparatus of clause A, the memory storing instructions that, when executed by the processor, perform a method further comprising using the predicted distribution for downstream processing, wherein downstream processing comprises one or more of: animating a virtual representation of the person, recognising a gesture performed by the person, tracking at least one body part of the person for interaction with a virtual world.

Clause C. The apparatus of any preceding clause, wherein the joint rotations are three-dimensional and are represented by rotation matrices.

Clause D. The apparatus of any preceding clause, wherein the trained neural network outputs predicted Fisher parameters which parametrise a Fisher distribution of rotation matrices, wherein the Fisher distribution is defined for each joint rotation of the joint rotations.

Using the Fisher distribution of rotation matrices which enables the direct prediction of joint rotations and/or 3D joint locations reduces the size of the required neural network and increases the speed of the method for predicting pose, compared to a two-staged network for indirect joint rotation predictions or the prediction of 2D heat maps of joint locations, and compared to an indirect method for predicting pose comprising a single-stage neural network and an optimisation or fitting stage.

Reducing the size of the required neural network includes reducing the number of parameters of the neural network.

Clause E. The apparatus of any preceding clause, wherein the predicted distribution is associated with a parametric human model comprising joints.

Clause F. The apparatus of clause E, wherein the predicted 3D joint locations of the distribution over predicted 3D joint locations are regressed from the distribution over predicted joint rotations using the parametric human model.

Clause G. The apparatus of any preceding clause, the memory storing instructions that, when executed by the processor, perform a method further comprising calculating statistical parameters describing the distribution over joint rotations and/or 3D locations, wherein the statistical parameters include an uncertainty.

Clause H. The apparatus of any preceding claim, wherein the joint of the person is not depicted in the image received from the egocentric camera.

Clause I. A method of training a neural network, comprising:
  accessing training images which are egocentric images, wherein a training image depicts at least a portion of a person where joint rotations or three-dimensional (3D) joint locations of the person are known; and
  using supervised training to train a neural network on the training images to directly predict a distribution over rotation or over three-dimensional, 3D, locations of a joint of the person, using a loss function.

Clause J. The method of clause I, wherein the known joint rotations or 3D locations are defined for each joint of a parametric human model.

Clause K. The method of clause I or J, wherein the neural network is trained to output predicted Fisher parameters which parametrise a Fisher distribution of rotation matrices, wherein the Fisher distribution is defined for each joint of the known joints.

Clause L. The method of clause K, wherein the joint rotations are known, and wherein the loss function is probabilistic and is a matrix Fisher negative log-likelihood loss.

Training using a probabilistic distribution loss including the matrix Fisher negative log-likelihood loss provides more accurate predictions compared to a deterministic loss.

Clause M. The method of clause K, wherein the joint rotations are known, and wherein the loss function is probabilistic and is the summation of the matrix Fisher negative log-likelihood loss, and a loss supervising 3D joint locations.

Clause N. The method of clause M, wherein the loss supervising 3D joint locations uses known 3D joint locations and predicted 3D joint locations regressed from a parametric human model using predicted joint rotation matrices.

Clause O. The method of clause N, wherein each predicted joint rotation matrix of the predicted joint rotation matrices is determined by calculating the rotation mean of the predicted matrix Fisher parameters for each joint.

Clause P. The method of any of clause J to P, wherein the known 3D joint locations are regressed from the parametric human model using known joint rotations.

Clause Q. The method of any of clause J to K, wherein the loss function is a loss supervising one or more of: probabilistic 2D joint locations, probabilistic 3D joint locations, probabilistic joint rotations.

Clause R. The method of clause J or N, wherein the parametric human model includes body shape parameters, wherein the body shape parameters of the person are known, and wherein the body shape of the parametric human model is trained on the training images to be predicted by the neural network using a negative log-likelihood loss over the distribution of body shape parameters.

Clause S. The method of any of clause I to K, wherein the loss function is an L2 loss supervising the two-dimensional, 2D, joint locations in a 2D image plane of each image of the training images, wherein the neural network is trained to predict 3D joint locations which are subsequently projected onto the 2D image plane.

Clause T. A method of predicting a pose of a person comprising:
  receiving an image from an egocentric camera, the image depicting only a portion of the person;
  using a trained neural network to directly predict a distribution over joint rotation of a joint of the person or a distribution over three-dimensional, 3D, location of a joint of the person, wherein the joint of the person is not depicted in the image from the egocentric camera;
  using the predicted distribution for one or more of: animating a virtual representation of the person, recognising a gesture performed by the person, tracking the at least one body part of the person for interaction with a virtual world.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in various examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of examples. Although various examples have been described above with a certain degree of particularity, or with reference to one or more individual examples, those skilled in the art could make numerous alterations to the disclosed examples without departing from the scope of this specification.

What is claimed is:

1. An apparatus comprising:
a processor;
a memory storing instructions that, when executed by the processor, perform a method for predicting a pose of a person, comprising:
receiving an image from an egocentric camera, the image depicting only a portion of the person; and
using a trained neural network to:
predict a distribution of values over a rotation of a joint of the person or a distribution of values over a three-dimensional (3D) location of a joint of the person, and
predict a plurality of uncertainty values associated with the predicted distribution of values over the rotation of the joint of the person or the predicted distribution of values over the 3D location of the joint of the person, the plurality of uncertainty values comprising an uncertainty value associated with the predicted distribution of values over the rotation of the joint when the joint lies outside of the received image.

2. The apparatus of claim 1, the memory storing instructions that, when executed by the processor, perform a method further comprising using the predicted distribution of values for downstream processing, wherein downstream processing comprises one or more of:
animating a virtual representation of the person,
recognizing a gesture performed by the person, or
tracking at least one body part of the person for interaction with a virtual world.

3. The apparatus of claim 1, wherein the rotation of the joint of a person is three-dimensional and is represented by a rotation matrix.

4. The apparatus of claim 1, wherein the trained neural network outputs predicted Fisher parameters which parametrize a Fisher distribution of rotation matrices, wherein the Fisher distribution is defined for a joint rotation of the distribution of values over the rotation of the joint of the person.

5. The apparatus of claim 1, wherein the predicted distribution of values is associated with a parametric human model comprising a plurality of joints.

6. The apparatus of claim 5, wherein the predicted distribution of values over the 3D location of the joint of the person is regressed from the predicted distribution of values over the rotation of the joint of the person using the parametric human model.

7. The apparatus of claim 1, performing the method further comprising: calculating a statistical parameter describing the distribution of values, wherein the statistical parameter includes an uncertainty value of the plurality of uncertainty values.

8. The apparatus of claim 1, wherein the received image is a single image, and the predicted distribution of values is based on the single image.

9. A method of training a neural network, comprising:
accessing a plurality of training images which are a plurality of egocentric images,
a training image of the plurality of training images depicting at least a portion of a person, and
a joint rotation or a three-dimensional (3D) joint location of a known joint of the person are a known joint rotation or a known 3D joint location; and
performing supervised training using a loss function, train a neural network on the training images to:
predict a distribution of values over a rotation of a joint of the person or a distribution of values over a three-dimensional (3D) location of the joint of the person, and
predict a plurality of uncertainty values associated with the predicted distribution of values over the rotation of the joint of the person or the predicted distribution of values over the 3D location of the joint of the person,
the plurality of uncertainty values comprising an uncertainty value associated with the predicted distribution of values over the rotation of the joint when the joint lies outside of the received image.

10. The method of claim 9, wherein the known joint rotation or the known 3D joint location is are defined for a joint of a parametric human model.

11. The method of claim 10, wherein:
the parametric human model includes a plurality of body shape parameters, the plurality of body shape parameters of the person are known, and the neural network is further trained on the plurality of training images to predict a body shape of the parametric human model using a negative log-likelihood loss over a distribution of the plurality of body shape parameters.

12. The method of claim 9, wherein:

the neural network is trained to output predicted Fisher parameters which parametrise a Fisher distribution of rotation matrices, and the Fisher distribution is defined for the known joint of a plurality of known joints.

13. The method of claim 12, wherein the loss function is probabilistic and a matrix Fisher negative log-likelihood loss.

14. The method of claim 12, wherein the loss function is:

probabilistic, and a summation of a matrix Fisher negative log-likelihood loss and a loss supervising 3D joint locations.

15. The method of claim 14, wherein the loss supervising 3D joint locations uses known 3D joint locations and predicted 3D joint locations regressed from a parametric human model using a plurality of predicted joint rotation matrices.

16. The method of claim 15, wherein a predicted joint rotation matrix of the plurality of predicted joint rotation matrices is determined by calculating a rotation mean of the predicted Fisher parameters for the known joint.

17. The method of claim 9, wherein the known 3D joint location is regressed from a parametric human model using the known joint rotation.

18. The method of claim 9, wherein the loss function is a loss supervising one or more of:

a probabilistic 2D joint location, a probabilistic 3D joint location, or a probabilistic joint rotation.

19. The method of claim 9, wherein:

the loss function is an L2 loss supervising two-dimensional (2D) joint locations in a 2D image plane of the training image of the plurality of training images, and the neural network is further trained to predict 3D joint locations which are subsequently projected onto the 2D image plane.

20. A method of predicting a pose of a person comprising:

obtaining an image from an egocentric camera, the image depicting only a portion of the person;

inputting the image into a trained neural network;

using the trained neural network to predict, for a joint of a plurality of joints of the person, a distribution of values over a rotation of the joint of the person or a distribution of values over a three-dimensional (3D) location of the joint of the person, wherein the joint of the person is not depicted in the image from the egocentric camera, the predicted distribution over the rotation of the joint of the person or the predicted distribution over the 3D location of the joint of the person being associated with a parametric human model comprising joints, and a predicted 3D joint location of the predicted distribution over the 3D location of the joint of the person being regressed from the predicted distribution over the rotation of the joint of the person using the parametric human model;

calculating a plurality of statistical parameters describing the distribution over the rotation of the joint of the person or the distribution over the 3D location of the joint of the person for the joint of the plurality of joints, the plurality of statistical parameters including a per-joint uncertainty, and the per-joint uncertainty comprising an uncertainty value associated with the predicted distribution of values over the rotation of the joint when the joint lies outside of the received image;

propagating the per-joint uncertainty through a kinematic tree of a human body represented by the parametric human model; and using the predicted distribution over the rotation of the joint of the person or the predicted distribution over the 3D location of the joint of the person, including the per-joint uncertainty, for a downstream processing task comprising one or more of:

animating a virtual representation of the person, recognizing a gesture performed by the person, and tracking a body part of the person for interaction with a virtual world;

wherein:

a predicted joint rotation of the predicted distribution over the rotation of the joint of the person or the predicted 3D joint location of the predicted distribution over the 3D location of the joint of the person having a higher uncertainty compared to a threshold is not used for the downstream processing task, or a predicted joint rotation of the predicted distribution over the rotation of the joint of the person or the predicted 3D joint location of the predicted distribution over the 3D location of the joint of the person having a lower uncertainty compared to a threshold is used for a downstream task.

* * * * *